United States Patent
Kim et al.

(10) Patent No.: US 11,031,147 B2
(45) Date of Patent: Jun. 8, 2021

(54) SYSTEM FOR SETTING TOLERANCE LIMIT OF CORRELATION BY USING REPETITIVE CROSS-VALIDATION AND METHOD THEREOF

(71) Applicant: KEPCO NUCLEAR FUEL CO., LTD., Daejeon (KR)

(72) Inventors: Kang Hoon Kim, Daejeon (KR); Byeung Seok Kim, Daejeon (KR); Kee Yil Nahm, Daejeon (KR)

(73) Assignee: KEPCO NUCLEAR FUEL CO., LTD., Daejeon (KR)

(*) Notice: Subject to any disclaimer, the term of this patent is extended or adjusted under 35 U.S.C. 154(b) by 287 days.

(21) Appl. No.: 16/183,606

(22) Filed: Nov. 7, 2018

(65) Prior Publication Data

US 2019/0139659 A1 May 9, 2019

Related U.S. Application Data

(63) Continuation-in-part of application No. 15/563,267, filed as application No. PCT/KR2016/004340 on Apr. 26, 2016, now abandoned.

(30) Foreign Application Priority Data

Apr. 6, 2016 (KR) .......................... 10-2016-0042413

(51) Int. Cl.
*G21D 3/00* (2006.01)
*G06K 9/62* (2006.01)
(Continued)

(52) U.S. Cl.
CPC .............. *G21D 3/001* (2013.01); *G06F 17/15* (2013.01); *G06F 17/18* (2013.01); *G06K 9/6262* (2013.01);
(Continued)

(58) Field of Classification Search
CPC ............ G21D 3/001; G21D 3/04; G21D 3/08; G21D 3/10; G21D 3/002; G21D 3/06;
(Continued)

(56) References Cited

U.S. PATENT DOCUMENTS 6,061,412 A * 5/2000 Stacker ..................... G21D 3/04
376/217

FOREIGN PATENT DOCUMENTS

KR 10-2001-0039442 A 5/2001
KR 10-2004-0099884 A 12/2004
(Continued)

OTHER PUBLICATIONS

Knapp, Thomas R., (2013), "To pool or not to pool: That is the confusion", downloaded from URL: http://www.statlit.org/pdf/2013-Knapp-To-pool-or-not-to-pool.pdf, on Nov. 7, 2020. (Year: 2013).*

(Continued)

*Primary Examiner* — Darlene M Ritchie
(74) *Attorney, Agent, or Firm* — Rabin & Berdo, P.C.

(57) ABSTRACT

A correlation tolerance limit setting system using repetitive cross-validation includes: a variable extraction unit randomly classifying data of an initial DB set into training set data and validation set data at a specific rate and then extracting variables for determining a DNBR limit by optimizing coefficients of a selected correlation; a normality test unit testing normality for a variable extraction result; a DNBR limit unit determining whether data sets have a same population or not depending on normality result and determining DNBR limit from a distribution of 95/95 DNBR; and a controller.

8 Claims, 7 Drawing Sheets

(51) Int. Cl.
*G06F 17/15* (2006.01)
*G06F 17/18* (2006.01)
*G21D 3/06* (2006.01)
*G21D 3/04* (2006.01)
*G21C 17/10* (2006.01)

(52) U.S. Cl.
CPC ........... *G06K 9/6268* (2013.01); *G21C 17/10* (2013.01); *G21D 3/06* (2013.01); *G21D 3/04* (2013.01)

(58) Field of Classification Search
CPC .......... G21D 3/00; G21D 3/005; G21D 3/007; G21D 3/12; G21D 3/14; G21D 3/16; G21C 9/00; G21C 17/10; G21C 17/00; G21C 17/108; G06K 9/6268; G06K 9/6262; G06F 17/15; G06F 17/18; Y02E 30/00; Y02E 30/30; G05B 13/0265
See application file for complete search history.

(56) References Cited

FOREIGN PATENT DOCUMENTS

| KR | 10-2006-0076466 A | 7/2006 |
| KR | 10-2011-0052340 A | 5/2011 |

OTHER PUBLICATIONS

Gwangbong Kim, "A Study of the Validation of Nuclear Criticality Analysis Codes for Spent Fuel", Chosun University Graduate Degree Thesis, Feb. 25, 2016, pp. 25 and 29-33.

\* cited by examiner

SYSTEM FOR SETTING TOLERANCE LIMIT OF CORRELATION BY USING REPETITIVE CROSS-VALIDATION AND METHOD THEREOF

CROSS REFERENCE TO RELATED APPLICATION

This application is a continuation-in-part application of co-pending U.S. application Ser. No. 15/563,267, filed Sep. 29, 2017, the disclosure of which is incorporated herein by reference. This application claims priority benefits under 35 U.S.C. § 1.119 to Korean Patent Application No. 10-2016-0042413, filed Apr. 6, 2016.

BACKGROUND OF THE INVENTION

Field of the Invention

The present invention relates to a correlation tolerance limit setting system using repetitive cross-validation and method therefor. More particularly, the present invention relates to a correlation tolerance limit setting system using repetitive cross-validation and a method therefor to prevent intentional or unintentional distortion of material properties by human intervention or otherwise and a risk caused thereby or to quantify the influence induced by the distortion of the material properties for correlation optimization and tolerance limit setting.

Description of the Related Art

Hitherto, according to Korean Patent Laid-Open Publication No. 2011-0052340, as a method of evaluating a trip setpoint of a reactor core state, the trip setpoint is calculated by using information on neutron flux distribution calculated in advance with respect to each of more than 600 reactor core states, information on instruments for regional overpower protection, and information on thermal-hydraulics. Upon completion of a trip setpoint calculation, by deriving an optimal correlation between information on a signal distribution of instruments for regional overpower protection and the trip setpoint, a method is provided to determine the trip setpoint corresponding to each reactor core state using only the signal distribution of instruments.

In the conventional art, in a way to deal with the intolerable risk, correlation optimization is performed on the basis of data partitioning (training set versus validation set) of one round or limited number of cases, or, upon completion of related tasks of data partitioning at the level where the independent test datasets having same design or similar design characteristics are operated separately, the tolerance limit and application scope of the correlation are set individually through statistical analysis at a simple level for the separated dataset.

In the limited case, correlation optimization and tolerance limit setting based on the separated dataset have problems such that a risk caused by intentional or unintentional distortion of material properties by human intervention or otherwise is unable to be prevented, and the influence of the distortion of the material properties is unable to be quantified.

In addition, as an influence due to the difference of detailed design characteristics along with scope of reproducibility of test dataset is potentially involved when independent dataset having the same design or similar design characteristics is operated separately, there may be limitations in separating the intolerable risk or the influence thereof. Consequently, it inevitably increases cost for additional production of testing dataset.

The foregoing is intended merely to aid in the understanding of the background of the present invention, and is not intended to mean that the present invention falls within the purview of the related art that is already known to those skilled in the art.

SUMMARY OF THE INVENTION

An object of the present invention is to solve the above problems and to provide a correlation tolerance limit setting system using repetitive cross-validation and a method therefor to perform correlation optimization and tolerance limit setting within the limit complying with technical/regulatory requirements or to verify the effectiveness thereof.

Another object of the present invention is to provide a correlation tolerance limit setting system using repetitive cross-validation and a method therefor to prevent intentional or unintentional distortion of material properties by human intervention or otherwise and a risk caused thereby, or to quantify the influence induced by the distortion of the material properties.

In order to achieve the above object, according to one aspect of the present invention, there is provided a correlation tolerance limit setting system using repetitive cross-validation, the system including: a variable extraction unit randomly classifying data of an initial database (DB) set into training data and validation data at a specific rate, and then matching each of the training data and the validation data with each run identifier (ID) assigned thereto and storing them in a training initial set and a validation initial set, respectively, thereby extracting variables for determining a departure from nucleate boiling ratio (DNBR) limit by optimizing coefficients of a selected correlation based on the data stored in the training initial set; a normality test unit performing a normality test for data of a training set and data of a validation set after extracting the variables; and a DNBR limit unit determining the DNBR limit by a parametric method or a nonparametric method depending on a result of the normality test.

The variable extraction unit may preferably include: an initialization module classifying the data of the initial DB set into the training data and the validation data, and then matching the training data and the validation data with each run ID assigned thereto and storing them in the training initial set and the validation initial set, respectively, wherein the data for which the run ID of a full DB set and the run ID of the training initial set are the same to each other is stored in the training set, and the data for which the run ID of the full DB set and the run ID of the validation set are the same to each other is stored in the validation set; a correlation coefficient optimization module optimizing for fitting of the coefficients of the selected correlation using the data of the training initial set; an extraction module deriving the measured/predicted (M/P) for each run ID of the training set by applying optimized coefficients of the selected correlation to the data of the training set, and then extracting a maximum M/P for each run ID of the training set among the derived MP's; a location and statistics change determination module determining whether a measurement location of the core is changed or not with each run ID, having the extracted maximum M/P, of the training set or the statistics are changed or not with an average value of the derived M/P of each run ID of training initial set, wherein the optimized coefficients of the selected correlation are output when there is no change of the core measurement location, having the extracted maximum M/P, or statistics on the average value of the derived M/P's by iteratively performing optimization of the coefficients of the selected correlation until there is no change of the core measurement location, having the extracted maximum M/P, or statistics on the average value of the derived M/P's; and a variable extraction module applying the optimized coefficients of the selected correlation to each data of the validation set, and then extracting dependent variables, having the maximum M/P, of the data of the validation set as the variables for determining the DNBR limit.

The normality test unit may preferably perform the normality test for an M/P of each run ID of the poolable set by the parametric method or the nonparametric method when the data of the training set and the data of the validation set have the same population by the parametric method depending on a result of the normality test for the data of the training set and the data of the validation set.

In addition, the normality test unit may determine whether the data of the training set and the data of the validation set have the same population or not by the nonparametric method depending on the result of the normality test for the data of the training set and the data of the validation set, and when the data of the training set and the data of the validation set have the same population, the normality test unit performs the normality test for the M/P of each run ID of the poolable set by the parametric method or the nonparametric method; and the normality test unit determines whether the data of the training set and the data of the validation set have the same population or not by the nonparametric method depending on the result of the normality test for the data of the training set and the data of the validation set, and when the data of the training set and the data of the validation set do not have the same population, the normality test unit performs the normality test for the M/P of each run ID of the validation set by the parametric method or the nonparametric method.

The DNBR limit unit may preferably include: an output module determining whether the data of the training set and the data of the validation set have a same population or not by the parametric method or the nonparametric method depending on a result of the normality test for an M/P of a run ID of the training set and an M/P of a run ID of the validation set derived for each case, and performing the normality test for an M/P of a run ID of a poolable set which is combined with the training set and the validation set or the M/P of the run ID of the validation set by the parametric method or the nonparametric method depending on the result of whether the data of the training set and the data of the validation set have the same population or not; and a limit determination module deriving a distribution of 95/95 DNBR values for all N cases after calculating the 95/95 DNBR values by the parametric method or the nonparametric method depending on the result of the normality test for the M/P of the run ID of the poolable set or the M/P of the run ID of the validation set from the output module for each case, and determining a 95/95 DNBR limit using the derived distribution of the 95/95 DNBR values.

A correlation tolerance limit setting method using repetitive cross-validation, the method may include: step a) of randomly classifying data of an initial DB set into training data and validation data at a specific rate, and then matching each of the training data and the validation data with each run ID assigned thereto and storing them in a training initial set or a validation initial set, respectively, thereby extracting variables for determining a departure from nucleate boiling ratio (DNBR) limit by optimizing coefficients of a selected correlation based on the data stored in the training initial set; step b) of performing a normality test for data of a training set and a validation set after extracting the variables; and step c) of determining the DNBR limit by a parametric method or a nonparametric method depending on a result of the normality test.

The step a) may include: initialization substep a-1) of classifying the data of the initial DB set into the training data and the validation data, and then matching the training data and the validation data with each run ID assigned thereto and storing them in the training initial set and the validation initial set, respectively, wherein the data for which the run ID of a full DB set and the run ID of the training initial set are the same to each other is stored in the training set, and the data for which the run ID of the full DB set and the run ID of the validation set are the same to each other is stored in the validation set; correlation coefficient optimization substep a-2) of optimizing for fitting of the coefficients of the selected correlation using the data of the training initial set; extraction substep a-3) of deriving an M/P for each run ID of the training set by applying optimized coefficients of the selected correlation to the data of the training set, and then extracting a maximum M/P for each run ID of the training set among the derived MP's; location and statistics change determination substep a-4) of determining whether a measurement location of the core is changed or not with each run ID, having the extracted maximum M/P, of the training set or the statistics are changed or not with an average value of the derived M/P of each run ID of training initial set, wherein the optimized coefficients of the selected correlation are output when there is no change of the core measurement location, having the extracted maximum M/P, or statistics on the average value of the derived M/P's by iteratively performing optimization of the coefficients of the selected correlation until there is no change of the core measurement location, having the extracted maximum M/P, or statistics on the average value of the derived M/P's; and variable extraction substep a-5) of applying the optimized coefficients of the selected correlation to each data of the validation set, and then extracting the dependent variables, having the maximum M/P, of the data of the validation set as the variables for determining the DNBR limit.

At the step b), when the data of the training set and the data of the validation set have the same population by the parametric method depending on a result of the normality test for the data of the training set and the data of the validation set, the normality test for the M/P of each run ID of the poolable set may be performed by the parametric method or the nonparametric method.

In addition, at the step b), it may be determined whether the data of the training set and the data of the validation set have the same population or not by the nonparametric method depending on the result of the normality test for the data of the training set and the data of the validation set, and when the data of the training set and the data of the validation set have the same population, the normality test for the M/P of each run ID of the poolable set may be performed by the parametric method or the nonparametric method; it may be determined whether the data of the training set and the data of the validation set have the same population or not by the nonparametric method depending on the result of the normality test for the data of the training set and the data of the validation set; and when the data of the training set and the data of the validation set do not have the same population, the normality test for the M/P of each run ID of the validation set may be performed by the parametric method or the nonparametric method.

In addition, the step c) may include: substep c-1) of determining whether the data of the training set and the data of the validation set have a same population or not by the parametric method or the nonparametric method depending on a result of the normality test for the M/P of a run ID of the training set and an M/P of a run ID of the validation set derived for each case, and performing the normality test for an M/P of the run ID of a poolable set which is combined with the training set and the validation set or the M/P of the run ID of the validation set by the parametric method or the nonparametric method depending on the result of whether the data of the training set and the data of the validation set have the same population or not; and substep c-2) of deriving a distribution of a 95/95 DNBR value for all N cases after calculating the 95/95 DNBR value by the parametric method or the nonparametric method depending on the result of the normality test for the M/P of the run ID of the poolable set or the M/P of each run ID of the validation set from the output module for each case, and determining a 95/95 DNBR limit using the derived distribution of the/a 95/95 DNBR value.

As described above, there is an effect of preventing intentional or unintentional distortion of material properties by human intervention or otherwise and a risk caused thereby or an effect of quantifying the influence induced by the distortion of the material properties for correlation optimization and tolerance limit setting.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific characteristics and advantageous features of the present invention will become clearer through the description below with reference to the accompanying drawings. Prior to this, it should be noted that detailed descriptions of known functions and components incorporated herein have been omitted when it is determined that the gist of the present invention may be unnecessarily obfuscated thereby.

The present invention has a number of stored correlations expressing a relationship between each dependent variable and a reactor core trip setpoint in order to derive the reactor core trip setpoint from measured values of dependent variables instrumented at a predetermined location of a reactor core. Here, the correlation is a relational expression that relates distribution information of the measured values of the instrumented dependent variables to the reactor core trip setpoint, and a technique for selecting a correlation is disclosed in detail in Korean Patent Laid-Open Publication No. 2011-0052340.

Nevertheless, in the present embodiment, in order to derive a departure from nucleate boiling ratio (DNBR) limit, one of many correlations that expresses a relationship of a critical heat flux (CHF) and the measured value of each of the instrumented dependent variables is described as an example, but is not limited thereto.

In the present embodiment, a measured value of each of dependent variables instrumented at a predetermined location of the reactor core and a CHF which is an independent variable derived from a selected correlation are set as one data, and then the one data is assigned with a run ID and stored in an initial DB set. That is, the run ID is assigned to each measurement location, and the measured value of each of the instrumented dependent variables and the data including the CHF which is the independent variable are stored by being matched with the assigned run ID of the initial DB Set.

Meanwhile, an estimate of the CHF derived from the dependent variables and the selected correlation is derived for each node of the reactor core through a predetermined algorithm. Then, each of the dependent variables derived for each node and the data including the estimate of the CHF are stored in the full DB set by being matched with the run ID assigned to each node. Accordingly, the dependent variables and the estimate of the CHF which is the independent variable, at each node, are stored by being matched with the run ID of the full DB set assigned to each node.

In addition, in the present embodiment, training data for optimizing the coefficients of the selected correlation among the data of the initial DB set is stored in the training initial set, and the validation data for verifying the optimized coefficient is stored in the validation initial set, wherein the training data and the validation data are randomly classified.

For example, six numbers of the training data of ten numbers of the data stored in the initial DB set are stored in the training initial set, and remaining four numbers of the validation data are stored in the validation initial set.

In addition, in the present embodiment, the training set stores the training data for which the run ID of the full DB set and the run ID of the training initial DB correspond to each other, and the validation set stores the validation data for which the run ID of the full DB set and the run ID of the classified validation initial DB correspond to each other.

In addition, since the run ID of the training set in the present specification refers to the data stored by being matched with the run ID of the training set, the run ID of the training set, the data of the training set, and the data of the run ID of the training set may be mixed with each other to describe in the present specification.

In addition, since the run ID of the validation set in the present specification refers to the data stored by being matched with the run ID of the validation set, the run ID of the validation set, the data of the validation set, and the data of the run ID of the validation set may be mixed with each other to describe in the present specification.

In addition, in the present embodiment, the coefficients included in the correlation between the dependent variables and the CHF may be optimized for fitting through a signal distribution of the measured values of the dependent variables and a predetermined analysis algorithm. Further, the technique of optimizing the coefficients of the selected correlation may be applied to the process of obtaining the determination coefficients of the variable using general statistical analysis techniques.

Therefore, the present invention is configured to perform the normality test for the M/P of a run ID of the training set including the data of the CHF derived from the correlation having the measured values of the instrumented dependent variables and the optimized coefficients and for the M/P of a run ID of the validation set, and to derive the DNBR limit by a predetermined parametric method or a nonparametric method depending on the result of the normality test.

Hereinafter, the present invention will be described in detail with reference to the accompanying drawings.

Figure 1:
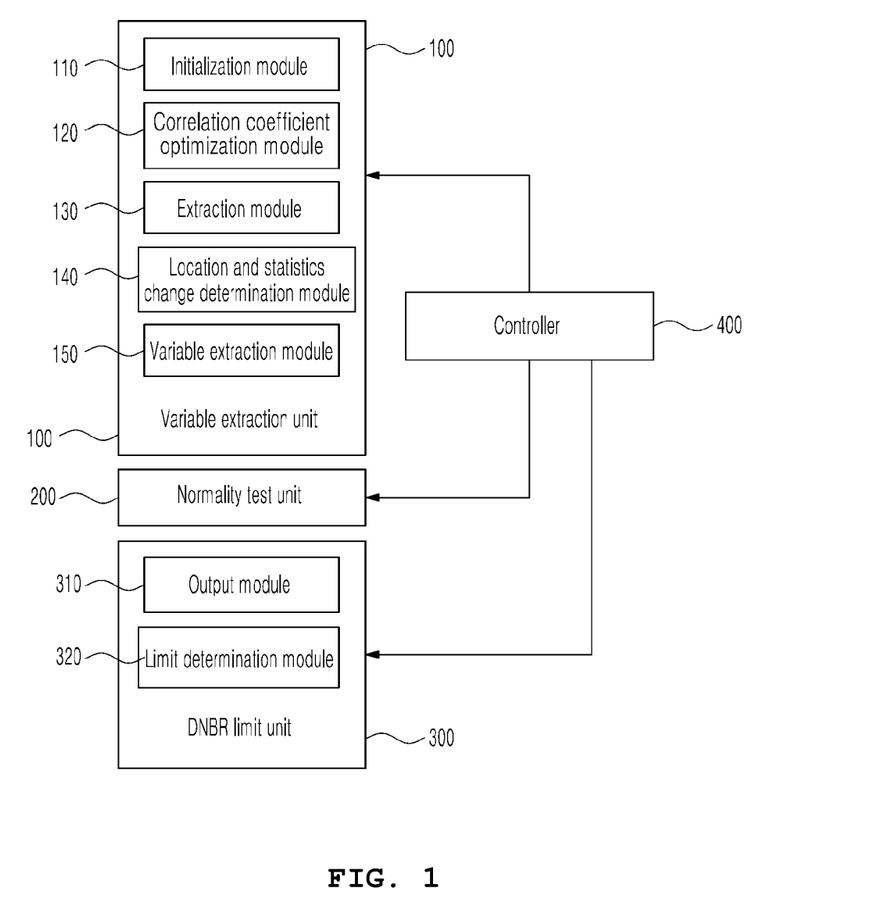
FIG. 1 is a block diagram illustrating a tolerance limit setting system of an embodiment of the present invention.
Figure 2:
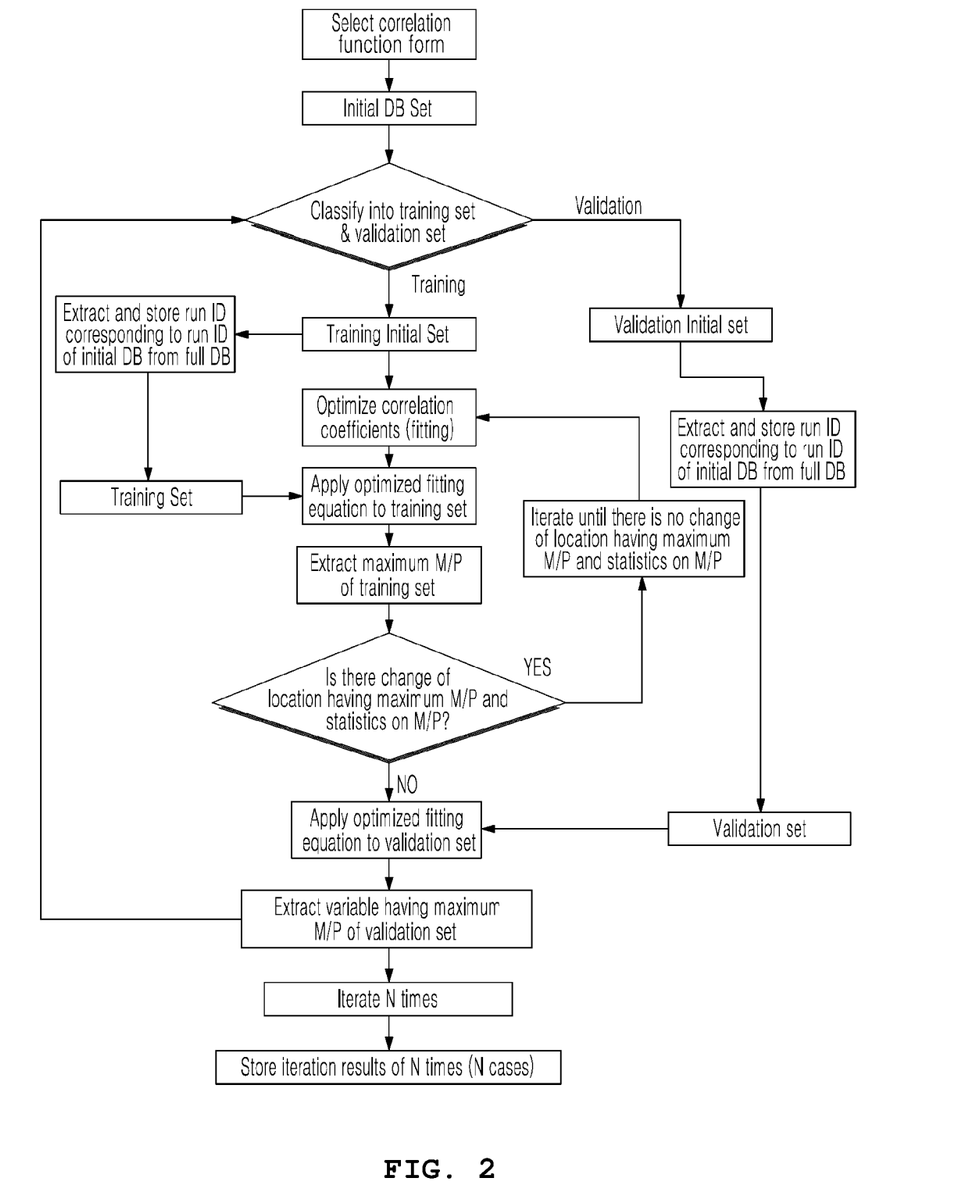
FIG. 2 is a diagram illustrating a process of variable extraction of a system of an embodiment of the present invention.
Figure 3:
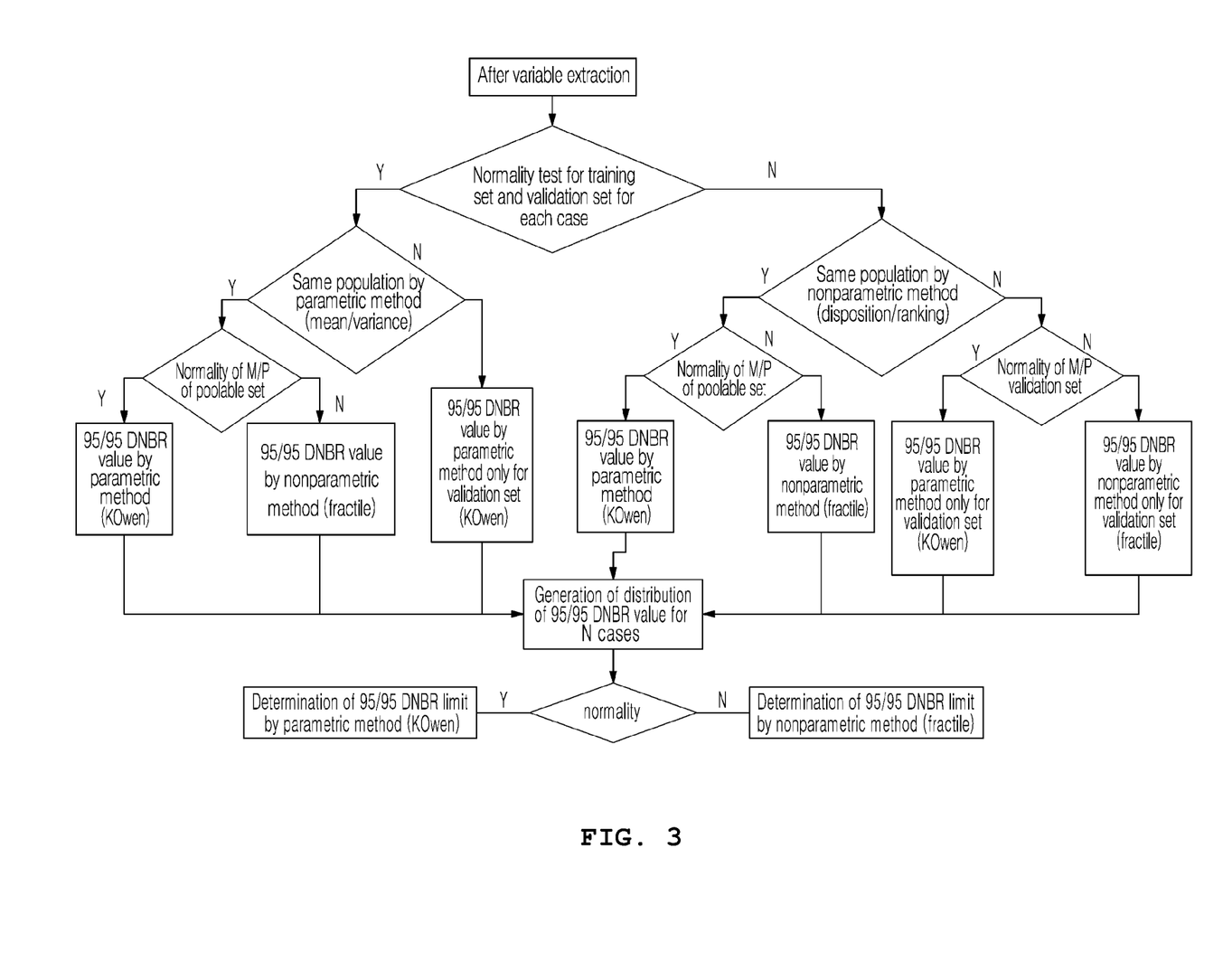
FIG. 3 is a diagram illustrating a process of a normality test and a DNBR limit determination of a system of an embodiment of the present invention.

FIG. 1 is a block diagram illustrating a correlation tolerance limit setting system using repetitive cross-validation according to an embodiment of the present invention, FIG. 2 is a diagram illustrating a process of variable extraction of a correlation tolerance limit setting system using repetitive cross-validation according to an embodiment of the present invention, and FIG. 3 is a diagram illustrating a process of a normality test and a DNBR limit determination of a correlation tolerance limit setting system using repetitive cross-validation according to an embodiment of the present invention.

As illustrated in FIG. 1, the correlation tolerance limit setting system using repetitive cross-validation according to the embodiment of the present invention includes a variable extraction unit 100, a normality test unit 200, a DNBR limit unit 300, and a controller 400.

First, the variable extraction unit 100 randomly classifies the data of the initial DB set into the training data and the validation data at a specific rate, and then stores the training data and the validation data in the training initial set and the validation initial set, respectively. In this case, the data, for which the run ID of the training initial set and the run ID of the full DB set correspond to each other, of the training initial set is stored in the training set, and the data, for which the run ID of the validation set and the run ID of the full DB set correspond to each other, of the validation initial set is stored in the validation set.

In addition, the variable extraction unit 100 may optimize the coefficients of the selected correlation using the data of the training initial set; derive the maximum M/P of each run ID of the validation set by applying the optimized coefficients to the data of each run ID of the validation set; and extract dependent variables, having the derived maximum M/P of the run ID, of the validation set as variables for deriving a DNBR limit.

Here, a series of processes for extracting the variables for deriving the DNBR limit is iterated N times (N cases), wherein the N is a number determined arbitrarily.

The variable extraction unit 100 for performing a function of extracting variables for deriving the DNBR limit value includes an initialization module 110, a correlation coefficient optimization module 120, an extraction module 130, a location and statistics change determination module 140, and a variable extraction module 150.

Here, the initialization module 110 randomly classifies the data of the initial DB set into the training data and the validation data; matching each of the training data and the validation data with each run ID assigned to each measurement location, in a training initial set and a validation initial set and storing them, respectively; and generates the training set and the validation set with the training data and the validation data, respectively, wherein the run ID of the training initial set and the run ID of the full DB set correspond to each other for the training data, and the run ID of the validation initial set and the run ID of the full DB set correspond to each other for the validation data.

Meanwhile, the correlation coefficient optimization module 120 performs a function of optimizing the coefficients of the selected correlation based on the data of the training initial set classified in the initialization module 110.

Next, the extraction module 130 derives a measured value of the CHF, which is the independent variable, by applying the correlation to which the optimized coefficients are applied to the data of each run ID of the training set and extracts the run ID, having the maximum M/P, of the training set after deriving a ratio of the derived measured value M of the CHF to the estimate P of the CHF for each node of the full DB set for each run ID.

In this case, since a series of processes of extracting the run ID, having the maximum M/P, of the training set is proceeded iteratively for each node of the full DB set, the measurement location of the core for the run ID having the maximum M/P and the statistics on the M/P may be changed every time a series of processes of extracting the run ID, having the maximum M/P, of the training set is iterated. Here, the statistics are the average value of the M/P's each derived for a run ID.

Next, the location and statistics change determination module 140 determines whether the measurement location of the core is changed or not or the statistics on the average value of the M/P's is changed or not with the run ID, having the extracted maximum M/P, of the training set, and when the measurement location of the core changes, performs iteratively a series of processes of optimizing the coefficients of the selected correlation until there is no change of the core measurement location. At this time, the coefficient of the selected correlation is optimized with the data of the training initial set.

In addition, the location and statistics change determination module 140, when the statistics on the average value of the M/P's changes, performs iteratively a series of processes of optimizing for fitting of the coefficients of the selected correlation until there is no statistical change with respect to the derived average value of the derived M/P's.

In addition, when there is no change in the measurement location of the core having the maximum M/P and the statistics on the average value of the M/P's in the location and statistics change determination module 140, the optimized coefficients are transmitted to the extraction module 150.

The variable extraction module 150 derives the measured value of the CHF by applying the optimized coefficients to the data of each run ID of the validation set, derives a ratio M/P of the derived measured value of the CHF to the estimate of the CHF for each node of the full DB set, and extracts the dependent variables, having the maximum M/P, of the data of the validation set as the variables for deriving the DNBR limit. In this case, since the inverse of the maximum M/P is the DNBR limit, the maximum M/P is applied to obtain the minimum DNBR limit in an embodiment of the present invention.

The process of extracting the variables is performed by iterating an arbitrarily predetermined number of times (N times, N cases) in the variable extraction unit 100, then the normality test is performed for the data of the training set and the data of the validation set for each case in the normality test unit 200, and the DNBR limit is derived either by a parametric method or a nonparametric method depending on the result of the normality test.

Here, the 'N' may be arbitrarily set to 5, 10, 20, 100, 200, 500, 1000, 5000 or greater, and even about 1000 times in the exemplary embodiment of the present invention would be appropriate.

Figure 5:
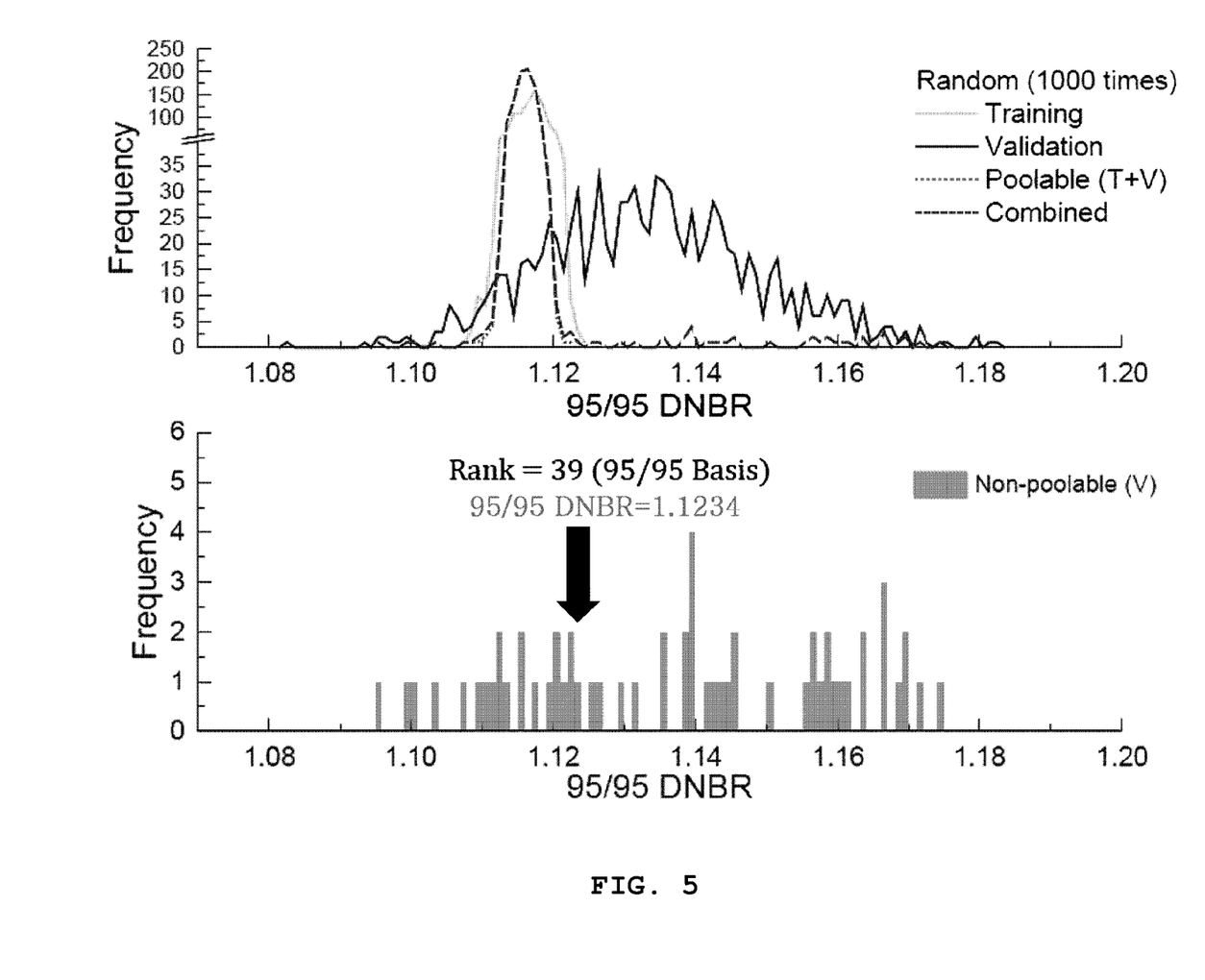
FIG. 5 shows views illustrating conceptual results of a system of another embodiment of the present invention.

FIG. 5 shows views illustrating conceptual results of a correlation tolerance limit setting system using repetitive cross-validation according to another embodiment of the present invention.

Conceptual results in an exemplary embodiment are shown in Table 1 and FIG. 5 below.

TABLE 1

| Individual tolerance distribution | Dataset classification | No. of case | Average | S.D. | Remark |
|---|---|---|---|---|---|
| Poolability | Poolable (T + V) | 941 | 1.1161 | 0.0017 | |
| | Non-poolable (V) | 59 | 1.1375 | 0.0220 | |
| Combined | (T + V) and (V) | 1000 | 1.1173 | 0.0075 | 1.1234 (39$^{th}$ value*) |

In the Table 1 above, * indicates nonparametric fractile.

The normality test unit 200 extracts variables for determining the DNBR limit and then performs the normality test for the data of the training set of the extraction module 130 and the data of the validation set of the variable extraction module 150. Here, the normality test unit 200 performs the normality test for each case and iteratively performs up to a predetermined number of N times (N cases).

In addition, when the result of the normality test for the data of the training set and the data of the validation set is a normal distribution, the normality test unit 200 determines whether the data of the training set and the data of the validation set have a same population or not by the parametric method. Here, the parametric method is a conventional art widely known as a statistical analysis technique for estimating a specific value of an unknown population parameter on an assumption that data (population parameter) is a normal distribution.

In this case, when the data of the training set and the data of the validation set have the same population by the parametric method, the normality test unit 200 performs the normality test for the data of the poolable set, wherein the data of the poolable set is formed by combining the data of the data of the training set and the data of the validation set.

On the other hand, when the result of the normality test for the data of the training set and the data of the validation set is not a normal distribution, the normality test unit 200 determines whether the data of the training set and the data of the validation set have a same population or not by the nonparametric method. Here, the nonparametric method is a conventional art widely known as a statistical analysis technique for estimating a specific value of an unknown population parameter on an assumption that data (population parameter) is not a normal distribution.

In addition, when the result of the normality test for the data of the training set and the data of the validation set is not a normal distribution, and the data of the training set and the data of the validation set have a same population by the nonparametric method, the normality test unit 200 performs the normality test for the M/P of each run ID of the poolable set.

In addition, when the result of the normality test for the data of the training set and the data of the validation set is not a normal distribution, and the data of the training set and the data of the validation set do not have a same population by the nonparametric method, the normality test unit 200 performs the normality test for the M/P of each run ID of the validation set.

Meanwhile, when the data of the training set and the data of the validation set have the same population by the parametric method or the nonparametric method, the DNBR limit unit 300 may generate a DNBR value for the M/P of each run ID of the poolable set by the parametric method or the nonparametric method depending on the result of the normality test for the M/P of each run ID of the poolable set; output a distribution of the 95/95 DNBR value generated for each case; perform the normality test for the distribution of the 95/95 DNBR value output above; and determine the 95/95 DNBR limit by the parametric method or the nonparametric method depending on the result of the normality test.

In addition, when the data of the training set and the data of the validation set do not have the same population by the parametric method, the DNBR limit unit 300 may generate a DNBR value for the M/P of each run ID of the validation set by the parametric method; output a distribution of the 95/95 DNBR value generated for N cases; perform the normality test for the distribution of the 95/95 DNBR value output above; and determine the 95/95 DNBR limit by the parametric method or the nonparametric method depending on the result of the normality test.

In addition, when the data of the training set and the data of the validation set have the same population by the nonparametric method, the DNBR limit unit 300 may generate a DNBR value for the M/P of each run ID of the poolable set by the parametric method or the nonparametric method depending on the result of the normality test for the M/P of each run ID of the poolable set; output a distribution of the 95/95 DNBR value generated for each case; perform the normality test for the distribution of the 95/95 DNBR value output above; and determine the 95/95 DNBR limit by the parametric method or the nonparametric method depending on the result of the normality test.

Meanwhile, when the data of the training set and the data of the validation set do not have the same population by the nonparametric method, the DNBR limit unit 300 may generate a DNBR value for the M/P of each run ID of the validation set by the parametric method or the nonparametric method depending on the result of the normality test for the M/P of each run ID of the validation set; output a distribution of the 95/95 DNBR value generated for all N cases; perform the normality test for the distribution of the 95/95 DNBR value output above; and determine the 95/95 DNBR limit by the parametric method or nonparametric method depending on the result of the normality test for the distribution of the 95/95 DNBR value.

The DNBR limit unit 300 like this may determine the tolerance limit from the distribution of the 95/95 DNBR value with 95/95 criteria (95% confidence and 95% probability); and prevent a distortion of data characteristics and a risk caused thereby and also quantify an influence of a distortion of data characteristics and a risk caused thereby. Here, since the tolerance limit is determined by estimating and evaluating the statistics on the population of the sample of the M/P, the tolerance limit in the embodiment of the present invention is the DNBR limit determined from the distribution of the 95/95 DNBR value.

The DNBR limit unit 300 for performing this function includes an output module 310 and a limit determination module 320.

The output module 310 determines whether the data of the training set and the data of the validation set have the same population or not by the parametric method or the nonparametric method for each case, and when the data of the training set and the data of the validation set have the same population, performs the normality test for the M/P of each run ID of the poolable set.

In addition, the limit determination module 320 generates the 95/95 DNBR value by the parametric method depending on the result of the normality test for the M/P of each run ID of the poolable set of the output module 310.

In addition, the limit determination module 320 generates a 95/95 DNBR value by the nonparametric method depending on the result of the normality test for the M/P of each run ID of the poolable set of the output module 310. The limit determination module 320 generates a distribution of a 95/95 DNBR value for all N cases.

In addition, the limit determination module 320 is configured to determine a 95/95 DNBR limit by the parametric method or a 95/95 DNBR limit by the nonparametric method for a distribution of the 95/95 DNBR value for all N cases.

In addition, when the data of the training set and the data of the validation set do not have the same population by the parametric method for each case of the output module 310, the limit determination module 320 generates a 95/95 DNBR value for the M/P of each run ID of the validation set by the parametric method; and generates a distribution of the 95/95 DNBR value for all N Cases.

In addition, when the data of the training set and the data of the validation set do not have the same population by the parametric method for each case of the output module 310, the limit determination module 320 performs the normality test for the M/P of each run ID of the validation set; generates a 95/95 DNBR value for the M/P of each run ID of the validation set by the nonparametric method or the parametric method depending on the result of the normality test; and generates a distribution of the 95/95 DNBR value for all N Cases.

The limit decision module 320 determines a 95/95 DNBR limit by the parametric method or determines a 95/95 DNBR limit by the nonparametric method for the distribution of the 95/95 DNBR values for all N cases.

For reference, the DNBR is a quantitative reference value that assesses whether a CHF occurs or not on the surface of a nuclear fuel rod as a variable for deriving the allowable limit (DNBR limit) for controlling the reactor core from the CHF derived from the selected correlation, and is determined by statistically assessing the prediction uncertainty of the correlation of the CHF. According to the thermal design criteria for a reactor core, the DNBR limit should be so set that the probability that the CHF will not occur should be 95% or greater at the confidence level of 95% or greater. In addition, the DNBR is defined as the ratio of the CHF prediction (=P) to the actual local thermal flux (=A). That is DNBR=P/A. In an experimental condition for the CHF, as the actual local thermal flux is identical to the CHF measurement (=M), the DNBR has the same meaning as P/M. In addition, the CHF estimate P predicted by the selected correlation at a given local hydrothermal condition is always calculated as a constant value, but the actual measured CHF measurement value M may have some arbitrary value due to the randomness of the physical phenomena. From this point of view, a random variable for statistical evaluation of the DNBR is selected as M/P. To meet the design criteria for the CHF, an actual local heat flux in an arbitrary operating condition should be smaller than the measured critical thermal flux. That is, A<M, and here, provided the uncertainty of M is taken into consideration, the above condition is expressed as follows according to the 95/95 design criteria, $$A < M(95/95 \text{ lower limit}).$$

By applying DNBR=P/A, with both sides divided by P, it becomes, $$DNBR > 1/(M/P)_{95/95 \text{ lower limit}}.$$

From this, a DNBR limit is defined as, $$DNBR \text{ limit} = 1/(M/P)_{95/95 \text{ lower limit}}.$$

Figure 6:
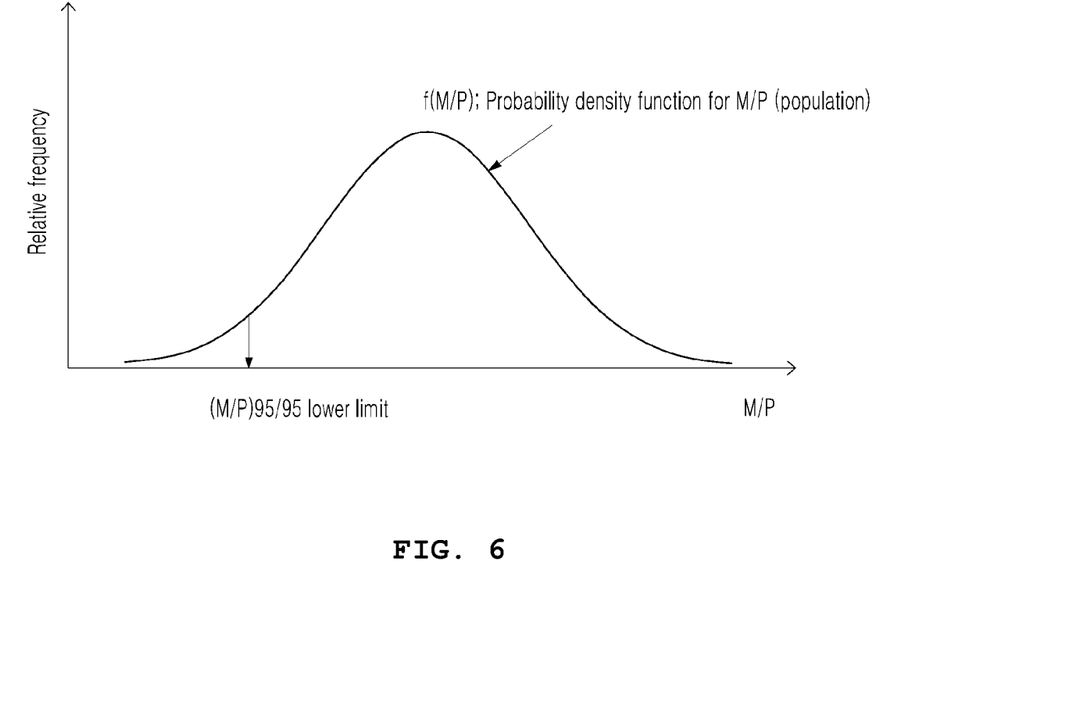
FIG. 6 is a graph illustrating a concept of a tolerance limit of a system of an embodiment of the present invention.

FIG. 6 is a conceptual diagram of a probability distribution and tolerance limit of a correlation M/P, and the tolerance limit set by estimating and assessing the population statistics on the $(M/P)_{95/95}$ lower limit is determined as described below, and the DNBR limit which is the tolerance limit is determined as the $(M/P)_{95/95 \text{ lower limit}}$.

The controller 400 is configured to control the variable extraction unit 100, the normality test unit 200, and the DNBR limit unit 300.

A method using, by the controller, the correlation tolerance limit setting system using repetitive cross-validation according to an embodiment of the present invention is described as follows.

Figure 4:
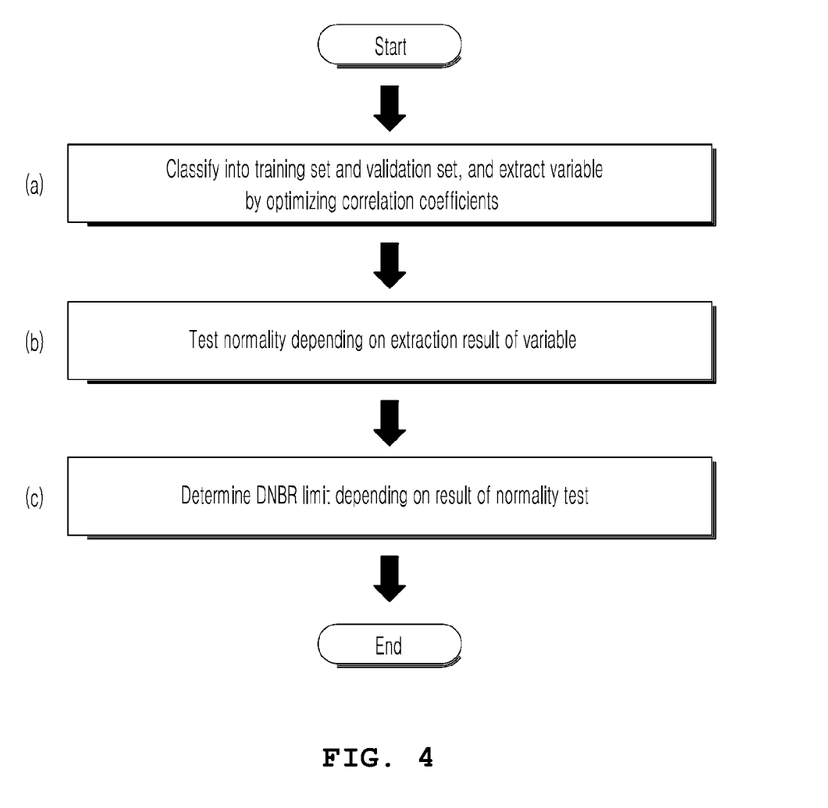
FIG. 4 is an overall flowchart illustrating a process of tolerance limit setting of another embodiment of the present invention.

FIG. 4 is a flowchart illustrating the method using the correlation tolerance limit setting system using repetitive cross-validation according to an embodiment of the present invention.

First, at step a), the controller classifies the data of the initial DB set into the training data and the validation data, and then matching each of the training data and the validation data with each run ID assigned to each measurement location, in a training initial set and a validation initial set and storing them, respectively; optimizes the coefficients of the selected correlation with the data of the training initial set and then derives the maximum M/P of the validation set by applying the optimized coefficients to each run ID of the validation set; and allows the derived dependent variables, having the derived maximum M/P, of the validation set to be extracted as variables for determining the DNBR limit.

Next, at step b), the controller performs the normality test for the M/P of each run ID of the training set and the M/P of each run ID of the validation set.

Subsequently, at step c), the controller determines the DNBR limit by the parametric method or the nonparametric method depending on the result of the normality test at the step b).

At the step a), the correlation optimization and the variable extraction processes are performed as follows. ① First, the data of the initial DB set is randomly classified (data partitioning) into the training data and the validation data, and then the training initial set and the validation initial set are set, respectively. ② Next, the coefficients of the selected correlation are optimized with the data of the training initial set until there is no change of the measurement location of the reactor core having the maximum M/P of each run ID of the training set or the statistics on the average value of the M/P's of each run ID of the training set. ③ Next, the M/P of each run ID of the validation set is calculated, and then the dependent variables, having the maximum M/P, of each run ID of the validation set are extracted as the variables for determining the DNBR limit. ④ Next, the derived M/P is stored by being matched with the run ID of the training set and the run ID of the validation set. ⑤ Next, the processes of ⓪ to ④ are iterated N times (N cases).

Specifically, the variable extraction processes at the step a) are as follows. At initialization substep a-1), the data of the initial DB set is randomly classified into the training data and the validation data; then, the classified training data and validation data are assigned with run ID and stored in the training initial set and the validation initial set, respectively; and subsequently, the training set is set with the data for which the run ID of the full DB set and the run ID of the training initial DB set are the same to each other; and the validation set is set with the data for which the run ID of the full DB set and the run ID of the validation initial DB set are the same to each other. Thereafter, at correlation coefficient optimization substep a-2), the coefficients of the selected correlation are optimized for fitting with the data of the training initial set. Next, at extraction substep a-3), the optimized coefficients of the correlation are applied to the data of each run ID of the training set, whereby the run ID, having the maximum M/P, of the training set is allowed to be extracted. Subsequently, at location and statistics change determination substep a-4), whether the measurement location and the statistics which are the average value of the M/P's are changed or not is determined by the run ID, having the extracted maximum M/P, of the training set, wherein the processes of optimizing the coefficients of the selected correlation are iterated until there is no change of measurement location or the statistics on the maximum M/P.

In addition, next, at variable extraction substep a-5), when there is no change of the measurement location of the reactor core having the extracted maximum M/P or statistics on the average value of M/P's, the optimized coefficients of the correlation are applied to the data of each run ID of the validation set, whereby the dependent variables, having the maximum M/P, of the data of the validation set are extracted as variables for determining the DNBR limit.

The above-described series of processes for extracting the variables is iteratively performed N times, wherein the N is a number determined arbitrarily.

At the step b), normality tests depending on extraction results of the variables are performed as follows. ⑥ Next, the normality test for the M/P of each run ID of the training set and the M/P of each run ID of the validation set is performed for each case. ⑦ Next, whether the data of the training set and the data of the validation set have the same population or not is determined by the parametric method or the nonparametric method depending on the results of the normality test for the M/P of each run ID of the training set and the M/P of each run ID of the validation set for each case. Subsequently, when the data of the training set and the data of the validation set have the same population, the normality test is performed for the M/P of each run ID of the poolable set which is combined with the training set and the validation set, and when the data of the training set and the data of the validation set do not have the same population, the normality test is performed for the M/P of each run ID of the validation set. ⑧ In calculating the 95/95 DNBR value for each case, when the data of the training set and the data of the validation set have the same population, the 95/95 DNBR value is determined with the M/P of each run ID of the poolable set. That is, the 95/95 DNBR value is calculated by the parametric method or the nonparametric method depending on the result of the normality test for the M/P of each run ID of the poolable set.

When the data of the training set and the data of the validation set do not have the same population, the 95/95 DNBR value is calculated by the parametric method or the nonparametric method depending on the result of the normality test for the M/P of each run ID of the validation set.

⑨ The distribution of the 95/95 DNBR value calculated for all cases based on the result of '⑧' is generated for the training set, validation set, poolable set (training set+validation set), non-poolable set (validation set), and combined set (poolable set+non-poolable set). ⑩ Then, the normality test is performed for the distribution of 95/95 DNBR value of '⑨'.

At the step b), the normality test is performed for the data of the training set and the data of the validation set for each case, whether the data of the training set and the data of the validation set have the same population or not is determined by the parametric method or the nonparametric method, the normality test is performed for the M/P of each run ID of the poolable set and the M/P of each run ID of the validation set, respectively, depending on the determination result of whether the data of the training set and the data of the validation set have the same population or not.

At the step c), ⑪ when the result of the normality test for each of the M/P of each run ID of the poolable set and the M/P of each run ID of the validation set is a normal distribution at '⑩', the 95/95 DNBR limit is determined by the parametric method, and when the result of the normality test for each of the M/P of each run ID of the poolable set and the M/P of each run ID of the validation set is not a normal distribution at '⑩', the 95/95 DNBR limit is determined by the nonparametric method. ⑫ In determining the 95/95 DNBR limit, the 95/95 DNBR limit for the data of the 'combined set' is determined to be 1.1234→1.124 in one embodiment, and the average of the distribution of the data of the 'validation set' is determined as 1.1337→1.134 in another embodiment.

In addition, the step c) includes substep c-1) outputting the distribution of the 95/95 DNBR value based on the 95/95 DNBR value determined for each case depending on the result of the normality test for the M/P of each run ID of the poolable set and the result of the normality test for the M/P of each run ID of the validation set by the parametric method and the nonparametric method; and substep c-2) determining the 95/95 DNBR limit by the parametric method or determining the 95/95 DNBR limit by the nonparametric method depending on the result of the normality test for the distribution of the 95/95 DNBR value.

In an embodiment of the present invention, the data partitioning should be a random classification base for each case, but may be allowed to include k-folds. A k-folds technique implements data partitioning into k subgroups being not to overlap each other and iterates k times by setting k-1 subgroups as the training set and one subgroup as the validation set.

The normality test in an embodiment of the present invention may be able to perform the tolerance limit setting and verification thereof for the distribution of the 95/95 DNBR value by using not only the M/P but also the M/P-1, M-P, or P/M, P/M-1, P-M, and the like of each run ID of each of the training set, validation set, poolable set, non-poolable set, and combined (poolable+non-poolable) set.

In another embodiment, as an extension of the exemplary embodiment provided, 'generation of the distribution of the 95/95 DNBR value determined for each case' may be possibly implemented in a form of iterative operation until the case N is reached. In addition, in each case, the configuration and analysis of an embodiment of the present invention may be possibly implemented for 'the distribution of the 95/95 DNBR value' by combining the case of same population and the case of not the same population with respect to the data of the training data set and the data of the validation data set.

TABLE 2

| Tolerance limit distribution | Group | No. of case | Average | S.D. | Remark |
|---|---|---|---|---|---|
| All | Training | 1000 | 1.1168 | 0.0027 | |
| | Validation | 1000 | 1.1337 | 0.0151 | 1.134 |

An effect by an operation of the correlation tolerance limit setting system using repetitive cross-validation according to the present invention is in reduction of the tolerance limit by maximum 2.5% compared with existing one, and the reduction of the tolerance limit is possibly to be utilized for the increase of safety margin or enhancement of actual performance. Compared with domestic technology level, the effect is the improvement by maximum 5%.

TABLE 3

| Case | | Presented tolerance limit | Risk/Effect | Expected tolerance limit |
|---|---|---|---|---|
| Existing/Similar technology not implemented (domestic level) | | 1.113 | Max. | 1.18 |
| Existing/Similar technology implemented (overseas level) | | 1.08-1.18 | Case-by-case | 1.15 |
| Invention technology | Typical embodiment (95/95 DNBR value distribution criteria with respect to combined data) | — | ~1% | 1.124 |
| | Other embodiment (95/95 DNBR value distribution criteria with respect to validation data) | — | ~2% | 1.134 |

* Compared with domestic technology level

Figure 7:
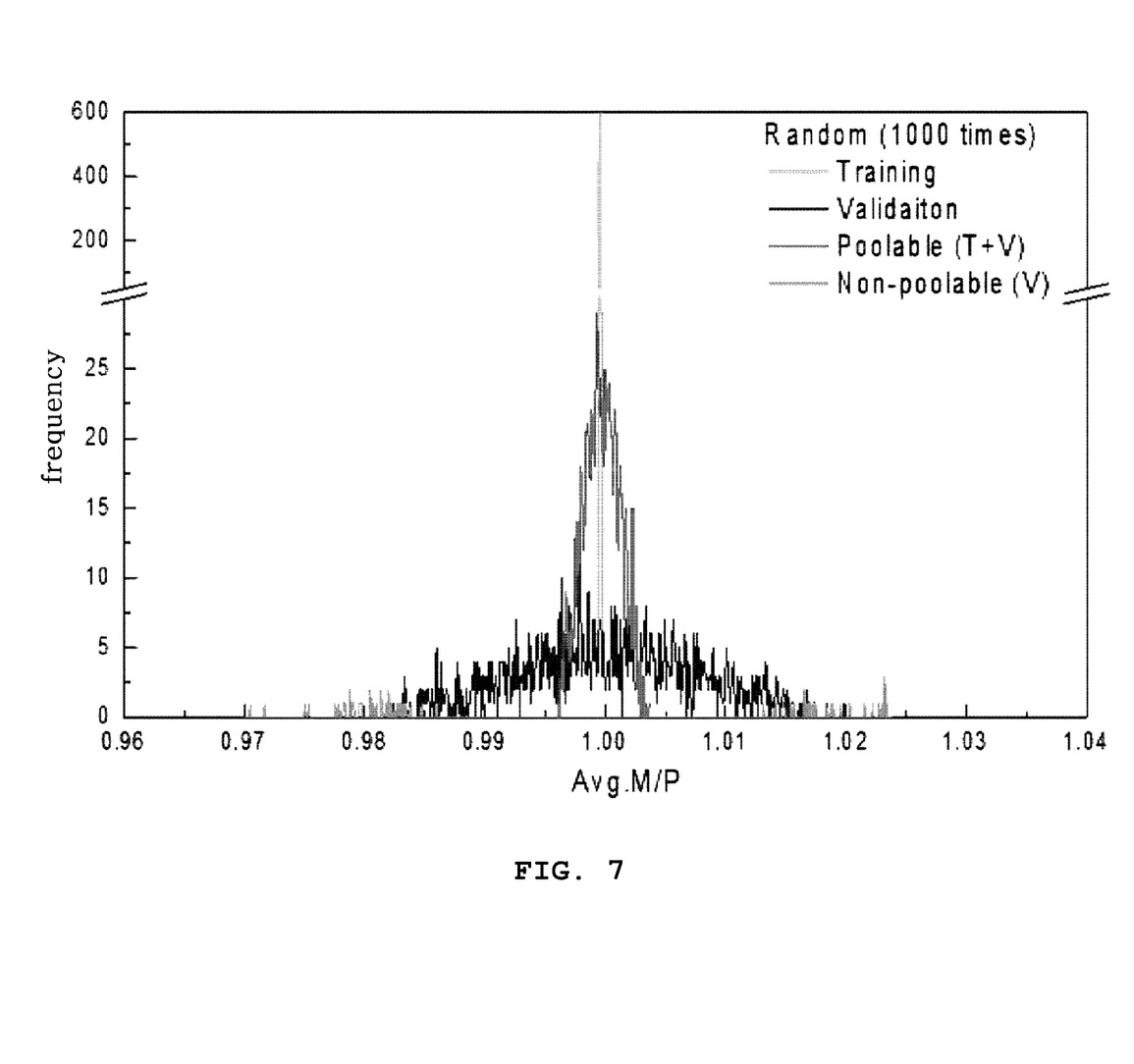
FIG. 7 is a graph illustrating distribution of average M/P of a system of an embodiment of the present invention.

FIG. 7 is a graph illustrating the distribution of averages of a variable extracted through the variable extraction unit of the correlation tolerance limit setting system using repetitive cross-validation according to an embodiment of the present invention.

FIG. 7 is a graph illustrating the average of the variables (M/P's) extracted from the data of the training set and the data of the validation set for each case by the correlation tolerance limit setting system illustrated in FIGS. 2 to 4 for each training set, validation set, poolable set, and non-poolable set.

The correlation tolerance limit setting system using repetitive cross-validation according to an embodiment of the present invention may confirm whether the extracted M/P of each run ID of the training set and the extracted M/P of each run ID of the validation set for each case have a same population or not by the parametric method or the nonparametric method, and when the population is confirmed to be same, may derive the 95/95 DNBR values by the parametric method or the nonparametric method.

In other words, the 95/95 DNBR values for the case of the same population or for the case of not the same population are generated by the parametric method or the nonparametric method, and the 95/95 DNBR limit may be determined by the parametric method or the nonparametric method depending on the result of the normality test for the generated 95/95 DNBR values.

A correlation tolerance limit setting method using repetitive cross-validation according to another embodiment of the present invention is as follows. ① First, the data of the initial DB set is randomly classified (data partitioning) into the training data and the validation data, and then the training initial set and the validation initial set are set, respectively.

② Next, in optimizing the coefficients of the selected correlation with the data of the training initial set, the coefficients of the selected correlation are optimized until there is no change of the measurement location of the reactor core having the derived maximum M/P of each run ID of the training set or the statistics on the average value of the M/P's of each run ID of the training set.

③ Next, the M/P of each run ID of the validation set is calculated by applying the optimized coefficients to the validation set, and then the dependent variables, having the maximum M/P, of the data of the validation set are extracted as the variables for determining the DNBR limit.

④ Then, each of the derived M/P of the training set and the derived M/P of the validation set is stored for each run ID assigned thereto.

⑤ Next, the processes ① to ④ are iterated N times (N cases).

⑥ Next, the normality test for the M/P of each run ID of the training set and the M/P of each run ID of the validation set is performed for each case.

⑦ Next, whether the data of the training set and the data of the validation set have the same population or not is determined by the parametric method or the nonparametric method depending on the results of the normality test for the M/P of each run ID of the training set and the M/P of each run ID of the validation set for each case. Subsequently, when the data of the training set and the data of the validation set have the same population, the normality test is performed for the M/P of each run ID of the poolable set which is combined with the training set and the validation set, and when the data of the training set and the data of the validation set do not have the same population, the normality test is performed for the M/P of each run ID of the validation set.

⑧ In calculating the 95/95 DNBR value for each case, when the data of the training set and the data of the validation set have the same population, the 95/95 DNBR value is determined with the M/P of each run ID of the poolable set. That is, the 95/95 DNBR value is calculated by the parametric method or the nonparametric method depending on the result of the normality test for the M/P of each run ID of the poolable set.

When the data of the training set and the data of the validation set do not have the same population, the 95/95 DNBR value is calculated by the parametric method or the nonparametric method depending on the result of the normality test for the M/P of each run ID of the validation set.

⑨ The distribution of the 95/95 DNBR value calculated for all cases based on the result of '⑧' is generated for the training set, validation set, poolable set (training set+validation set), non-poolable set (validation set), and combined set (poolable set+non-poolable set).

⑩ Then the normality test is performed for the distribution of 95/95 DNBR value of '⑨'.

⑪ When the result of the normality test for each of the M/P of each run ID of the poolable set and the M/P of each run ID of the validation set is a normal distribution at '⑩', the 95/95 DNBR limit is determined by the parametric method, and when the result of the normality test for each of the M/P of each run ID of the poolable set and the M/P of each run ID of the validation set is not a normal distribution at '⑩', the 95/95 DNBR limit is determined by the nonparametric method.

⑫ In determining the 95/95 DNBR limit, the 95/95 DNBR limit for the data of the 'combined set' is determined to be 1.1234→1.124 in one embodiment, and the average distribution of the data of the 'validation set' is determined as 1.1337 →1.134 in another embodiment.

DESCRIPTION OF THE REFERENCE NUMERALS IN THE DRAWINGS

100: Variable extraction unit, 110: Initialization module.
120: Correlation coefficient optimization module.
130: Extraction module.
140: Location and statistics change determination module.
150: Variable extraction module.
200: Normality test unit, 300: DNBR limit unit.
310: Output module.
320: Limit determination module.

What is claimed is:

1. A correlation tolerance limit setting system using repetitive cross-validation, the system comprising a controller including at least one of electronic logic circuits or processor-executable instructions stored on a non-transitory machine-readable medium, the controller being configured to implement:
a variable extraction algorithm randomly classifying data of an initial database (DB) set into training data and validation data at a specific rate, and then matching each of the training data and the validation data with each run identifier (ID) assigned thereto and storing them in a training initial set and a validation initial set, respectively, thereby extracting variables for determining a departure from nucleate boiling ratio (DNBR) limit by optimizing coefficients of a selected correlation based on the data stored in the training initial set;
a normality test algorithm performing a normality test for data of a training set and data of a validation set after extracting the variables; and
a DNBR limit algorithm determining the DNBR limit by a parametric method or a nonparametric method depending on a result of the normality test,
wherein the DNBR limit algorithm includes:
an output module determining whether the data of the training set and the data of the validation set have a same population or not by the parametric method or the nonparametric method depending on a result of the normality test for a measured/predicted value (M/P) of a run ID of the training set and an M/P of a run ID of the validation set derived for each case, and performing the normality test for an M/P of a run ID of a poolable set which is combined with the training set and the validation set or the M/P of the run ID of the validation set by the parametric method or the nonparametric method depending on the result of whether the data of the training set and the data of the validation set have the same population or not; and
a limit determination module deriving a distribution of 95/95 DNBR values for all N cases after calculating the 95/95 DNBR values by the parametric method or the nonparametric method depending on the result of the normality test for the M/P of the run ID of the poolable set or the M/P of the run ID of the validation set from the output module for each case, and determining a 95/95 DNBR limit using the derived distribution of the 95/95 DNBR values;
wherein the selected correlation expresses a relationship between each of dependent variables and a reactor core trip setpoint in order to derive the reactor core trip setpoint from measured values of dependent variables instrumented at a predetermined location of a reactor core, and a relationship of a critical heat flux (CHF) and the measured value of each of the instrumented dependent variables; and
wherein a measured value of the instrumented dependent variables and a CHF which is an independent variable derived from a selected correlation are set as one data, and then the one data is assigned with a run ID and stored in an initial DB set.

2. The system of claim 1, wherein the variable extraction algorithm includes:
an initialization module classifying the data of the initial DB set into the training data and the validation data, and then matching the training data and the validation data with each run ID assigned thereto and storing them in the training initial set and the validation initial set, respectively, wherein the data for which the run ID of a full DB set and the run ID of the training initial set are the same to each other is stored in the training set, and the data for which the run ID of the full DB set and the run ID of the validation set are the same to each other is stored in the validation set;
a correlation coefficient optimization module optimizing for fitting of the coefficients of the selected correlation using the data of the training initial set;
an extraction module deriving the M/P for each run ID of the training set by applying optimized coefficients of the selected correlation to the data of the training set, and then extracting a maximum M/P for each run ID of the training set among the derived MP's;
a location and statistics change determination module determining whether a measurement location of the core is changed or not with each run ID, having the extracted maximum M/P, of the training set or the statistics are changed or not with an average value of the derived M/P of each run ID of training initial set, wherein the optimized coefficients of the selected correlation are output when there is no change of the core measurement location, having the extracted maximum M/P, or statistics on the average value of the derived M/P's by iteratively performing optimization of the coefficients of the selected correlation until there is no change of the core measurement location, having the extracted maximum M/P, or_statistics on the average value of the derived M/P's; and
a variable extraction module applying the optimized coefficients of the selected correlation to each data of the validation set, and then extracting dependent variables, having the maximum M/P, of the data of the validation set as the variables for determining the DNBR limit.

3. The system of claim 1, wherein, when the data of the training set and the data of the validation set have the same population by the parametric method depending on a result of the normality test for the data of the training set and the data of the validation set, the normality test algorithm performs the normality test for the M/P of each run ID of the poolable set by the parametric method or the nonparametric method.

4. The system of claim 1, wherein the normality test algorithm determines whether the data of the training set and the data of the validation set have the same population or not by the nonparametric method depending on the result of the normality test for the data of the training set and the data of the validation set, and when the data of the training set and the data of the validation set have the same population, the normality test algorithm performs the normality test for the M/P of each run ID of the poolable set by the parametric method or the nonparametric method; and the normality test algorithm determines whether the data of the training set and the data of the validation set have the same population or not by the nonparametric method depending on the result of the normality test for the data of the training set and the data of the validation set, and when the data of the training set and the data of the validation set do not have the same population, the normality test algorithm performs the normality test for the M/P of each run ID of the validation set by the parametric method or the nonparametric method.

5. A correlation tolerance limit setting method using repetitive cross-validation, the method comprising:

step a) of randomly classifying data of an initial database (DB) set into training data and validation data at a specific rate, and then matching each of the training data and the validation data with each run identifier (ID) assigned thereto and storing them in a training initial set or a validation initial set, respectively, thereby extracting variables for determining a departure from nucleate boiling ratio (DNBR) limit by optimizing coefficients of a selected correlation based on the data stored in the training initial set;

step b) of performing a normality test for data of a training set and a validation set after extracting the variables; and step c) of determining the DNBR limit by a parametric method or a nonparametric method depending on a result of the normality test, wherein the step c) includes:

substep c-1) of determining whether the data of the training set and the data of the validation set have a same population or not by the parametric method or the nonparametric method depending on a result of the normality test for a measured/predicted value (M/P) of a run ID of the training set and an M/P of a run ID of the validation set derived for each case, and performing the normality test for an M/P of the run ID of a poolable set which is combined with the training set and the validation set or the M/P of the run ID of the validation set by the parametric method or the nonparametric method depending on the result of whether the data of the training set and the data of the validation set have the same population or not; and substep c-2) of deriving a distribution of a 95/95 DNBR value for all N cases after calculating the 95/95 DNBR value by the parametric method or the nonparametric method depending on the result of the normality test for the M/P of the run ID of the poolable set or the M/P of each run ID of the validation set from the output module for each case, and determining a 95/95 DNBR limit using the derived distribution of the/a 95/95 DNBR value;

wherein the selected correlation expresses a relationship between each of dependent variables and a reactor core trip setpoint in order to derive the reactor core trip setpoint from measured values of dependent variables instrumented at a predetermined location of a reactor core, and a relationship of a critical heat flux (CHF) and the measured value of each of the instrumented dependent variables; and wherein a measured value of the instrumented dependent variables and a CHF which is an independent variable derived from a selected correlation are set as one data, and then the one data is assigned with a run ID and stored in an initial DB set.

6. The method of claim 5, wherein the step a) includes:

initialization substep a-1) of classifying the data of the initial DB set into the training data and the validation data, and then matching the training data and the validation data-with each run ID assigned thereto and storing them in the training initial set and the validation initial set, respectively, wherein the data for which the run ID of a full DB set and the run ID of the training initial set are the same to each other is stored in the training set, and the data for which the run ID of the full DB set and the run ID of the validation set are the same to each other is stored in the validation set;

correlation coefficient optimization substep a-2) of optimizing for fitting of the coefficients of the selected correlation using the data of the training initial set;

extraction substep a-3) of deriving an M/P for each run ID of the training set by applying optimized coefficients of the selected correlation to the data of the training set, and then extracting a maximum M/P for each run ID of the training set among the derived MP's;

location and statistics change determination substep a-4) of determining whether a measurement location of the core is changed or not with each run ID, having the extracted maximum M/P, of the training set or the statistics are changed or not with an average value of the derived M/P of each run ID of training initial set, wherein the optimized coefficients of the selected correlation are output when there is no change of the core measurement location, having the extracted maximum M/P, or statistics on the average value of the derived M/P's by iteratively performing optimization of the coefficients of the selected correlation until there is no change of the core measurement location, having the extracted maximum M/P, or statistics on the average value of the derived M/P's; and variable extraction substep a-5) of applying the optimized coefficients of the selected correlation to each data of the validation set, and then extracting the dependent variables, having the maximum M/P, of the data of the validation set as the variables for determining the DNBR limit.

7. The method of claim 5, wherein, at the step b), when the data of the training set and the data of the validation set have the same population by the parametric method depending on a result of the normality test for the data of the training set and the data of the validation set, the normality test for the M/P of each run ID of the poolable set is performed by the parametric method or the nonparametric method.

8. The method of claim 5, wherein, at the step b), it is determined whether the data of the training set and the data of the validation set have the same population or not by the nonparametric method depending on the result of the normality test for the data of the training set and the data of the validation set, and when the data of the training set and the data of the validation set have the same population, the normality test for the M/P of each run ID of the poolable set is performed by the parametric method or the nonparametric method;

it is determined whether the data of the training set and the data of the validation set have the same population or not by the nonparametric method depending on the result of the normality test for the data of the training set and the data of the validation set; and when the data of the training set and the data of the validation set do not have the same population, the normality test for the M/P of each run ID of the validation set is performed by the parametric method or the nonparametric method.

\* \* \* \* \*